United States Patent [19]
Gordon et al.

[11] Patent Number: 5,489,072
[45] Date of Patent: Feb. 6, 1996

[54] SEAT BELT RETRACTOR WITH PRE-TENSIONER

[75] Inventors: Ian A. Gordon, Cumbria; Raymond G. Evans, Warrington; Stephen Armstrong, Cumbria, all of England

[73] Assignee: AlliedSignal Ltd., Kingswood, United Kingdom

[21] Appl. No.: 186,714

[22] Filed: Dec. 6, 1993

[30] Foreign Application Priority Data

Dec. 2, 1992 [GB] United Kingdom .................. 9225158

[51] Int. Cl.⁶ .................................................. B60R 22/46
[52] U.S. Cl. ............................................................ 242/374
[58] Field of Search .......................... 242/374; 280/806; 297/476–480

[56] References Cited

U.S. PATENT DOCUMENTS

| | | | |
|---|---|---|---|
| 4,423,846 | 1/1984 | Fohl | 242/374 |
| 4,508,287 | 4/1985 | Nilsson | 242/374 |
| 4,750,685 | 6/1988 | Frei | 242/374 |
| 5,344,095 | 9/1994 | Frei | 242/374 |

FOREIGN PATENT DOCUMENTS

| | | | |
|---|---|---|---|
| A0093238 | 11/1983 | European Pat. Off. . | |
| A0153726 | 9/1985 | European Pat. Off. . | |
| A0321960 | 6/1989 | European Pat. Off. . | |
| 3231509 | 3/1984 | Germany | 242/374 |

Primary Examiner—John M. Jillions
Attorney, Agent, or Firm—Markell Seitzman

[57] ABSTRACT

An emergency locking passenger seat belt retractor is fitted with a pyrotechnic pretensioner actuator (221) which acts via a cable wound on a drum (213), the drum being located on frangible supports in a clutch housing and having internally formed cam surfaces which can act upon frangibly supported intermediate rollers (215) to displace them generally radially inwards to drivingly engage a part of the webbing reel to tighten the belt. Advantageously the drum and the locking rollers are supported on frangible pegs moulded with shim or plate members (222a, 222b), disposed on each side of the drum (213).

11 Claims, 5 Drawing Sheets

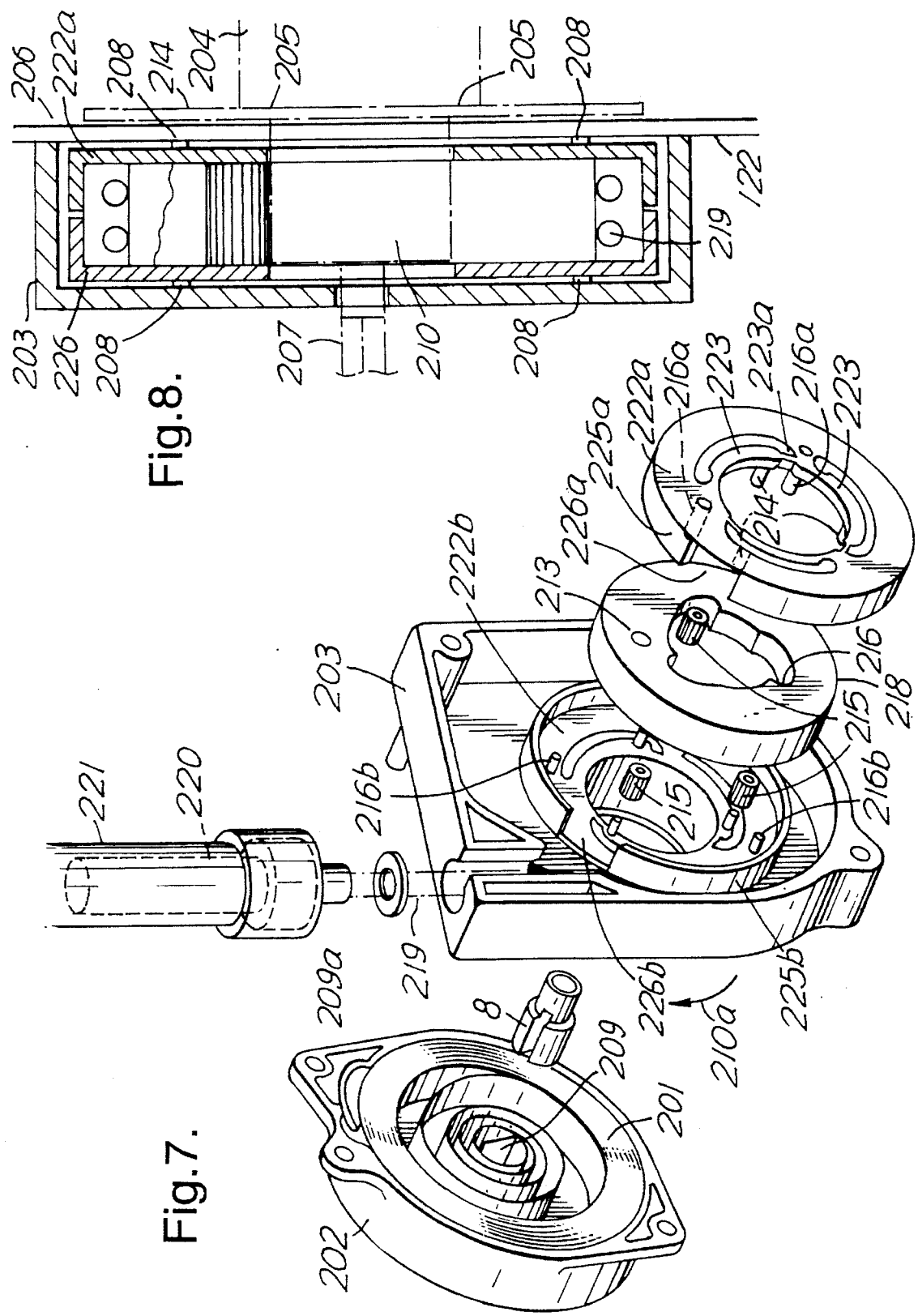

SEAT BELT RETRACTOR WITH PRE-TENSIONER

This invention relates to a seat belt retractor with a pre-tensioner.

In modern passenger vehicle restraint systems it is usual to provide seat belt webbing retractors which allow for payout and rewind of webbing for the purposes of providing a comfortable harness around an occupant. In addition to a light rewinding spring of a clock spring type such retractors are normally provided with emergency locking features whereby more than a predetermined belt acceleration and/or more than a predetermined rate of change of vehicle speed or webbing pull out speed results in positive locking of the retractor early in a crash sequence. It has also been proposed to provide such retractors with a pyrotechnic device which is detonated to almost instantaneously rewind up to a predetermined length of belt webbing in the early stages of a crash. Such action is known as pre-tensioning and is intended to further reduce the possible forward motion of an occupant during a crash to reduce injury due to impact with parts of the interior of the vehicle such as the steering wheel or facia panel.

According to the present invention there is provided a seat belt retractor comprising a frame, a belt reel rotatable in bearings, first means normally operable in a sense to rotate the reel in a belt rewinding direction and locking means operable to inhibit withdrawal of the belt in the event of an emergency and a pre-tensioning actuator with coupling means operable in the event of a crash to further rotate the reel in a rewinding direction to pre-tension the belt, characterised in that said coupling means comprises a first member rotationally fixed to the reel, a second normally stationary member which is rotatable by said actuator relative to the housing and at least one normally stationary intermediate member which is displaceable by rotation of the second member to provide rotary inter-engagement between the first and second members.

Preferably the first member is an axially extending generally cylindrical part of the spool and the second member is a drum part within which the first part rotates, the or each said intermediate part comprising a roller located by the housing but deflectable by a respective interior cam surface of the second member to effect said rotary inter-engagement.

In order that the invention may be more clearly understood and readily carried into effect the same will now be further described by way of an example with reference to the accompanying drawings of which:

The retractor in general comprises a generally U-shaped steel frame (not shown) the sides of which carry bearings supporting a webbing reel. On the exterior of one side of the frame there is provided a mechanism which senses the occurrence of excessive webbing pull-off acceleration or of excessive vehicle deceleration to initiate locking of the reel. Such a retractor is described for example in the Specification of European Patent No. 0170432. The other side of the frame is equipped with an encaged light spring such as a clock spring for automatically retracting and storing the webbing of the seat belt on the reel when it is released by the occupant.

Figure 2:
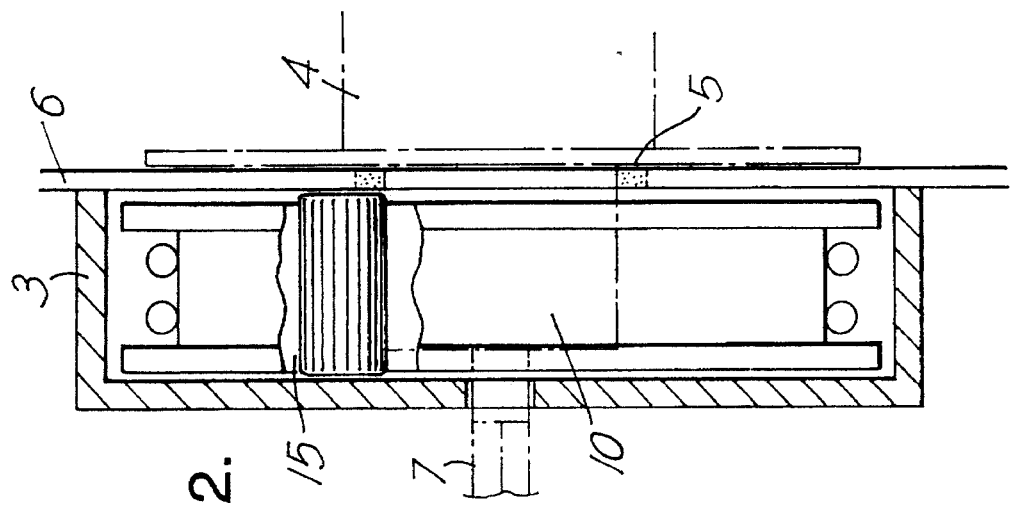
FIG. 2 is a sectional fragmental view of the assembly.
Figure 1:
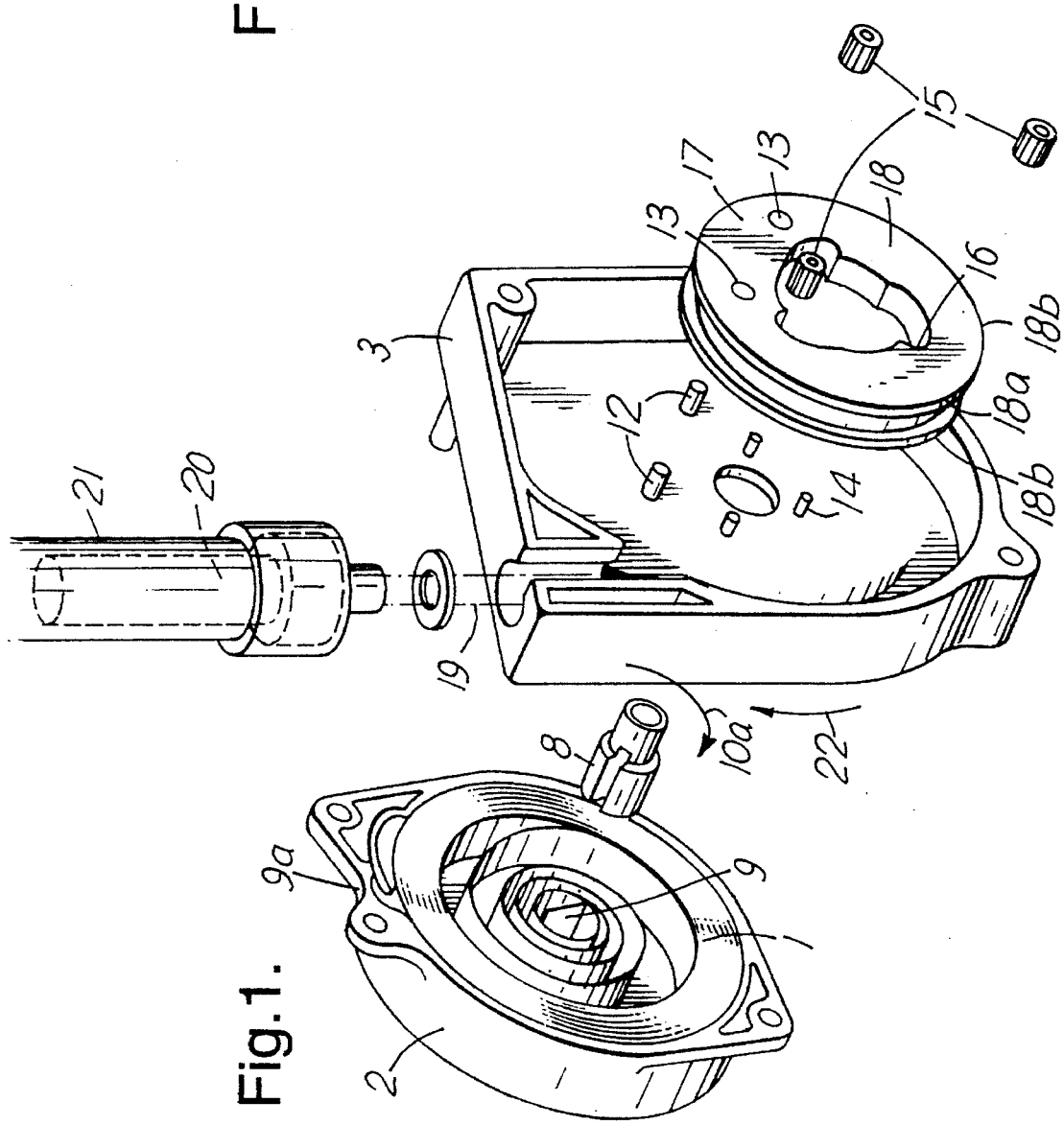
FIG. 1 is an exploded fragmental view of components of a seat belt retractor assembly.

As seen in the exploded view in FIG. 1, the encaged spring in the present example is a spring 1 of a clock spring type retained in an end-casing 2 which is mounted on one side of the retractor through the intermediary of a further pre-tensioner housing 3 additionally shown in diagrammatic sectional view in FIG. 2.

In FIG. 2, a reel 4 is seen to be carried in bearings such as 5 in the sides such as 6 of the U-shaped steel frame. The reel 4 has a smaller diameter cylindrical part 10 fixedly mounted on the shaft thereof extending into the intermediate housing 3. The outer end 7 of the reel shaft carries an arbor 8 which is connected to the inner end 9 of the spring 1 and the outer end 9a of the spring is connected to the casing whereby the spring effects rewinding of the seat belt webbing in the direction of arrow 10a.

The intermediate pre-tensioner housing 3 is of moulded plastic and is provided with two frangible pegs 12 integrally moulded on its interior. These pegs serve to locate in respective apertures 13 of a clutch drum 18 within which the cylindrical part 10 is freely rotatable. Located on 3 are a further three integrally moulded frangible pegs 14 rotatably carrying respective equally spaced locking rollers 15 of hard material such as steel which stand clear of and normally permit free rotation of the cylindrical part 10. In the assembled mechanism the rollers 15 are accommodated within internal arcuate indentations 16 of the clutch drum, the outer surfaces 17 of these indentations providing radially inwardly driving action in the event of rotation of drum 18 in the direction of arrow 22.

The periphery of the clutch drum 18 is provided with flanges 18b and an annular pulley surface 18a which receives several turns of the lower and of a connecting cable 19, the end being anchored to the drum 18. The connecting cable has its outward end connected to a piston 20 of a pyrotechnic force generator 21 mounted on housing 3. On being detonated the generator 21 can act in a sense to withdraw cable from the housing 3 and rotate drum 18 in the direction of arrow 22.

Figure 3:
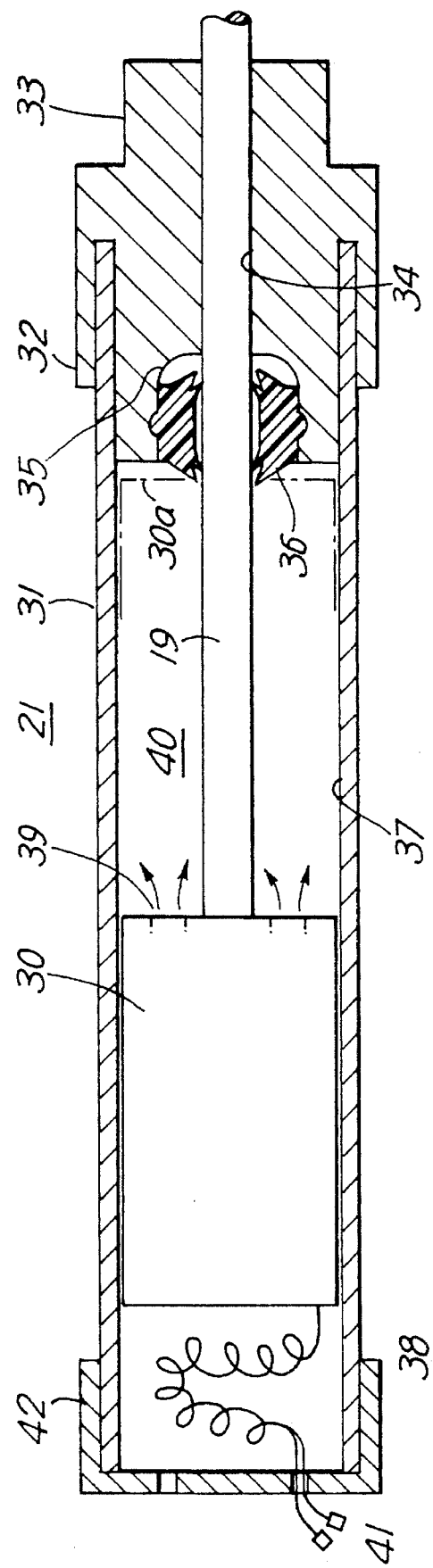
FIG. 3 is a part-sectional diagrammatic view of an actuator used in the assembly of FIG. 2.

Referring to FIG. 3, the pyrotechnic force generator 21 comprises a tube 31 with a sealed in lower end cap 32 designed with a lower spigot 33 received by the intermediate housing part 3 of the actuator. The end cap 32 has an axial bore 34 which opens out into the interior of the tube 31 via a shaped recess 35. The recess 35 houses a snap fit annular seal moulding 36 through which the connecting cable 19 passes. The seal 36 thereby provides a gas-tight passage for the cable 19. In the normal inactivated position of the actuator piston 30 the inward end thereof rests against the seal in a manner which urges the inner and of the seal into close contact with the cable as represented by the packed outline in FIG. 3. The piston 36 is freely slideable in the bore 37 of the tube 31 and houses an electrically detonated pyrotechnic device (not shown) which when detonated by an electric circuit via a flexible cable 38 results in rapid expansion of gas via outlets 39, into the chamber 40 between the piston and the cap 32. Access for electric connections 41 to the pyrotechnic device is provided through a vented end cap 42 as shown.

Figure 4:
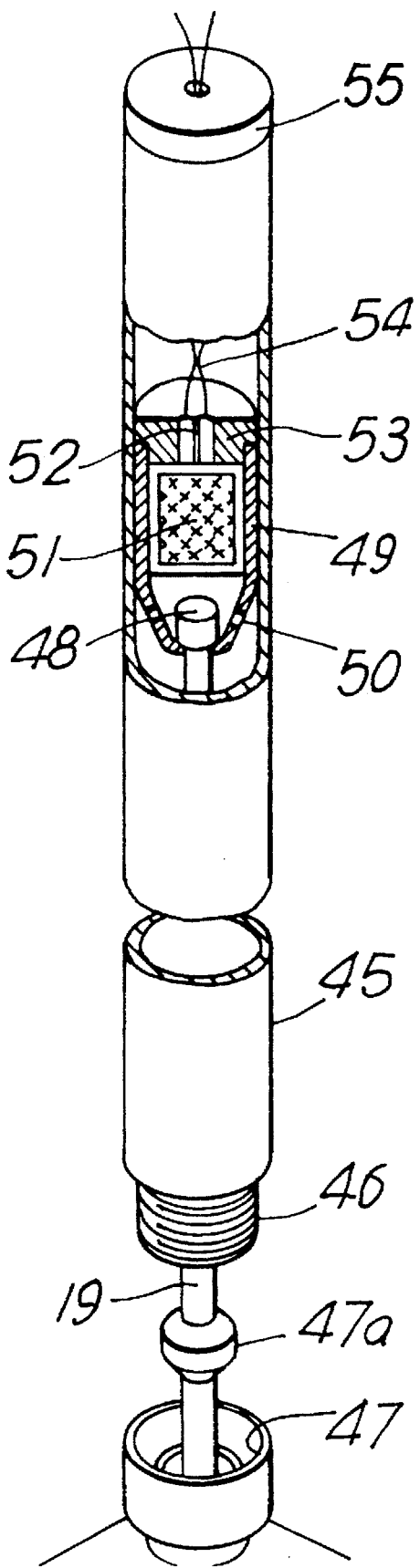
FIG. 4 is a partly cut-away diagrammatic view of the retractor and a piston incorporating a pyrotechnic device.

Referring to FIG. 4, the force generator shown therein is also designed to attach to a retractor housing part such as 3 of FIG. 1. A cylindrical body 45 has a threaded lower end 46 designed to be received by an attachment collar 47 of the actuator housing which traps a resilient seal 48 through which the cable 19 passes. The upper end of the cable 19 carries a crimp 48 which retains it in a pressed steel piston shell 49 having gas discharge apertures 50 at its lower end. The piston shell 49 is a sliding fit within the bore of the body 45 and carries within it a pyrotechnic capsule 51 and an electrical igniter 52 contained in an upper end cap 53 of the piston. Electric wires 54 extend from the end cap 53 outwardly through a vented top cover 55 of the actuator cylindrical body 45. The wires 54 are of sufficient length to permit the piston shell 49 to normally rest near the lower end of the cylindrical body 45. When the igniter 52 is activated by an electric current via wires 54, the pyrotechnic rapidly releases gas which is communicated via apertures 50 to the region below the piston, thereby driving the piston 49 and the cable 19 upwards to pre-tension the retractor reel as described in the following.

In operation of the retractor, after being seated an occupant withdraws seat belt webbing (not shown) and secures the belt in an operative condition by inserting a buckle tongue (not shown) into a buckle (not shown) in the usual manner. The belt is then retained comfortably for the occupant by the spring 1. In the event of predetermined webbing acceleration or vehicle deceleration limits being exceeded the normal emergency retractor locking mechanism (not shown) comes into operation and the reel is locked against withdrawal of seat belt webbing. In the event of a yet higher vehicle deceleration limit (which is indicative of a crash) being exceeded, the pyrotechnic actuator is detonated via electrical connections from an electro mechanism sensor (not shown) and the cable 19 is tensioned such that pins 12 are sheared by the resultant rotation of clutch drum 18 in the direction of arrow 22. Following this shearing of pins 12 the internal cam surfaces 17 of the clutch drum 18 drive the rollers 15 generally radially inwards. The pins 14 are thereby also sheared and enabling the rollers 15 to be trapped in locking position between the cam surfaces 17 and the outer surface of part 10 thereby rotationally driving the webbing reel in the direction of arrow 22 namely in a sense to tighten the belt webbing about the occupant in advance of development of a serious crash condition.

By virtue of the clutch components 14 and 15 being located by normally fixed albeit frangible pins 12 and 14, manual or automatic assembly can be simple. Moreover, no freely movable parts are added to a retractor mechanism which may become dislodged in normal use to interfere with the free running of the retractor. Only on an imminent crash condition occurring are the pins 12 and 14 sheared to permit pretensioning operation. Following such pretensioning, subsequent high tension which may occur in the seat belt as a result of the crash is then contained by the retractor locking components (not shown) and not transferred back to the clutch drum 14 or cable 18.

To improve the transmission of force from the force generator 21 to the reel 4 the friction coefficients in the clutch may be increased. This can be achieved in a number of ways. An example would be to provide rough and/or knurled surfaces on the rollers 15 the cylindrical part 10 and/or the arcuate surfaces 16.

The drum 18 may be made of plastics material since the bursting forces applied thereto by the interaction of the arcuate surfaces 16 with the rollers 15 may be effectively resisted by the crushing force of the cable 19 wrapped around the drum 18.

The modified construction which is illustrated in FIGS. 5 and 6 again comprises a generally U-shaped steel frame (not shown) the sides such as 106 (FIG. 2) of which carry bearings supporting a webbing reel. On the exterior of one side of the frame there is again provided a mechanism (not shown) which senses the occurrence of excessive webbing pull-off acceleration or of excessive vehicle deceleration. The other side of the frame is again equipped with an encaged spring 101 for automatically retracting and storing the webbing.

Figure 6:
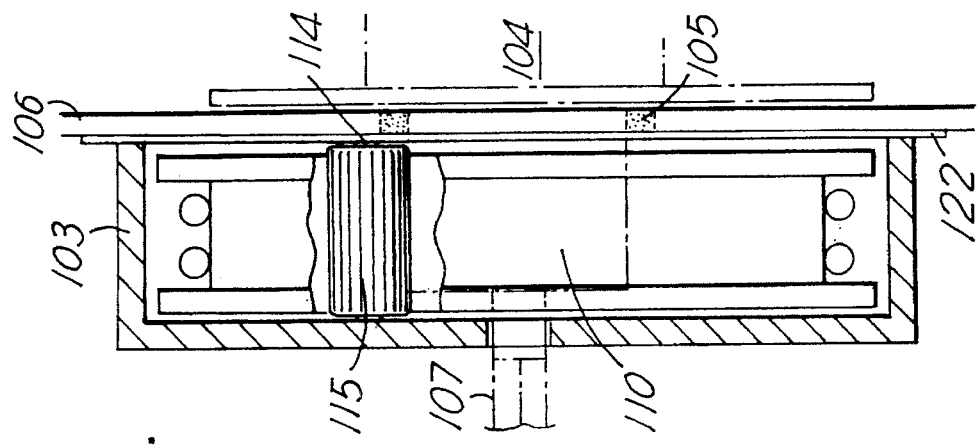
FIG. 5 and FIG. 6 are part-sectional diagrammatic views of a modification of the actuator of FIG. 3 and FIG. 7 and FIG. 8 are part sectional or diagrammatic views of a further modification of the actuator assembly of FIGS. 5 and 6.

In FIG. 6, the reel 104 is seen to be carried as before in bearings such as 105 and has a smaller diameter cylindrical part 110 extending into the intermediate housing 103. The outer end 107 of the reel shaft carries the arbor 108 which is connected to the inner end 109 of the spring 101 and the outer end 109a of the spring is connected to the casing whereby the spring effects rewinding of the seat belt webbing the direction of arrow 110a.

The housing 103 is of cast metal and is now provided with a moulded plastic shim or plate 122, clamped between housing 103 and the adjacent frame side 106, with two frangible pegs 112 on one surface which serve to locate in respective apertures 113 of a clutch drum 118 within the housing 103 so that the cylindrical part 110 is freely rotatable within the drum 118. The shim 122 has a central cut out 124 shaped to have three equally spaced peripherally extending fingers 123, the respective roots 123a of which are of reduced section to permit radially inward bending to readily occur. The radially inwardly movable ends of fingers 123 carry 3 further frangible pegs 114 which rotatably carry respective locking rollers such as 115 which are also normally clear of and permit uninhibited rotation of the cylindrical part 110. In the assembled mechanism the three rollers 115 are accommodated by respective internal arcuate indentations such as 116 of the clutch drum the outer surfaces 117 of these indentations providing generally radially inward driving action on the rollers in the event of rotation in the direction of arrow.

The periphery of the clutch drum 118 is again provided with flanges 118b an annular pulley surface 118a which receives several turns of the lower end of the connecting cable 119 the end thereof (not shown) being anchored to the drum. The connecting cable 119 has its outward end connected to a piston 120 of a pyrotechnic force generator 121 as described in the foregoing.

Figure 5:
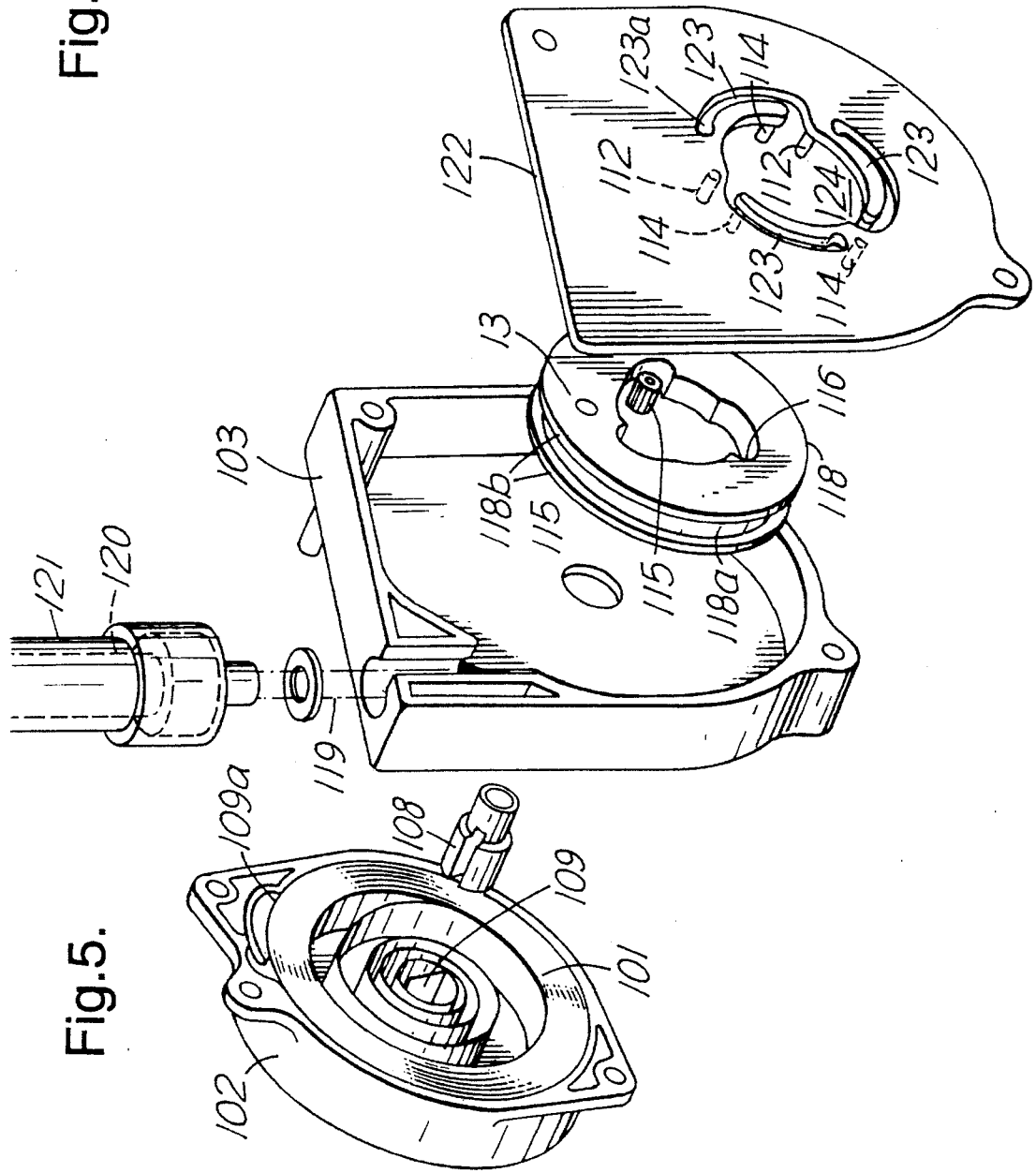

In operation of the retractor of FIGS. 5 and 6, and in the event of the webbing acceleration or vehicle deceleration limits being exceeded the normal emergency locking mechanism (not shown) comes into operation and the reel 104 is locked against withdrawal of seat belt webbing. In the event of a higher vehicle deceleration indicative of a crash being sensed the pyrotechnic actuator is detonated via electrical connections (not shown) and the cable 119 is tensioned such that pins 112 are sheared by the resultant rotation of clutch drum 118 in the direction of arrow 110a. Following shearing of pins 112 the internal cam surfaces 117 of the clutch drum 118 drive the rollers 115 generally radially inwards together with the ends of the fingers 123 on which they are carried by pins 114. The fingers 123 are able to flex at the reduced sections 123a. On engaging the cylindrical part 110, the rollers are locked between 100 and the drum 118 and since rotation of 118 continues the pins 114 can shear and drive the webbing reel to pretension the webbing belt (not shown) about the occupant in advance of onset of a serious crash condition. In other respects the construction and operation can be varied as described with reference to FIGS. 1 and 2.

By providing the frangible pins 112 and 114 on a shim or plate such as 122, the material of the housing 103 can be freely chosen without regard to frangibility. Typically the housing 103 is made of cast non-ferrous material such as a zinc alloy or a resilient plastic with mineral filler and glass filled by nylon and the shim 122 is moulded of a resilient plastic such as a polyoxymethylene (p.o.m.). In an alternative, the pins 112 and 114 can be provided on a shim which is retained between member 102 and 103 the pins extending through apertures in the housing 103 to support the drum 118 and rollers 115 in their normal and non-engaging positions.

In yet another variant upon the concepts of FIGS. 5 and 6, the clutch drum, rollers and cable assembly can be preassembled. This variant is shown in FIGS. 7 and 8 wherein the housing components 202, 203, 206, rewind spring 201 and pyrotechnic pretensioner cylinder 221 all correspond with equivalents in FIGS. 5 and 6. The essential difference resides in the provision of a banded pair of moulded shim caps which have central cutouts with peripherally extending fingers 223 similar to the fingers 123 of FIG. 5. However, the ends of these fingers carry frangible pegs 214 which are only half the axial length of the drum 218 and thereby can support the locking rollers such as 215 at both sides. Furthermore, the ends of the fingers 223 are joined to the adjacent body of the shim by thin frangible webs 223a which afford complete structural rigidity of support for the rollers under all predictable operating temperatures. Further internally moulded frangible pegs such as 216a and 216b locate in apertures 213 of the drum 218 to locate it with the shim caps. The peripheries of each of the shim caps 222a and 222b have mutually meeting flanges 225a and 225b which surround the assembled turns of the pretensioner cable, except for the provision of exit windows 226a and 226b. The shim caps each have location pegs 216b which locate in holes 213 in the drum 218 as before and have short moulded external locating pegs 208 which are of greater diameter and nonfrangibly engage in locating holes in the housing to precisely position the clutch components in relation to the housing and the cylindrical part 210 of the spool. The combined axial length of the drum 218 and the two enclosing shim caps is such that when assembled into the casing as in FIG. 8, the tolerances are such as to provide a rattle free assembly but to permit free rotation of the drum 218 by pretensioner action.

By virtue of the provision of two moulded shim caps 222a and 222b within which the locking rollers 215 and the clutch drum 218 are precisely locatable by means of frangible pegs these and the pretensioning cable 219 can be assembled together before insertion into the clutch housing 203.

In operation, normally the part 210 can rotate with the webbing reel 204 quite freely and unimpeded in either direction subject to the normal emergency locking (or automatic locking if fitted) of the retractor. However, in the event of crash conditions causing the pretensioner to operate tension is applied to the cable 219 and drum 218 commences rotation within the shim caps 222a and 222b which remain stationary, being retained by pins 208. However pins 216a and 216b are sheared by the pretensioner force and drum 218 rotates in the direction of arrow 210a driving the rollers inwards after shearing the webs 223a and 223b. On engagement between the internal rollers 215 and the part 210 the frangible pens 214 are sheared and the part 210 and webbing reel are thereby driven by drum 8 to tension the seat belt webbing. The webbing is subsequently retained by the retractor locking preventing pay-out from the pretensioned condition.

We claim:

1. A seat belt retractor comprising a frame, a belt reel rotatable within the frame, first means normally operable in a sense to rotate the reel in a belt-rewinding direction, locking means operable to inhibit withdrawal of the belt in the event of an emergency and including a pretensioning actuator with coupling means operable in the event of a crash to rotate the reel in a rewinding direction to tension the belt, wherein said coupling means is provided in a housing and comprises a first member rotationally fixed to the reel, a second normally stationary member which is rotatable relative to the housing by said actuator and at least one normally stationary intermediate member normally supported by the housing and separated from the first member but being displaceable by motion of internal cam surfaces of the second member to provide interengagement between the first and second members, wherein said housing includes a shim or plate which is formed to carry the intermediate member or members each on a respective deflectable finger permitting radial movement thereof towards the said first member.

2. A seat belt retractor as claimed in claim 1, wherein said second member is frangibly supported within said housing.

3. A seat belt retractor as claimed in claim 1 wherein said intermediate member or members are each frangibly supported within said housing.

4. A seat belt retractor as claimed in claim 1 wherein said intermediate members are supported on locating means moulded integrally with an internal surface of the housing part.

5. A seat belt retractor as claimed in claim 1, said shim or plate being formed with deflectable fingers which carry near their ends respective frangible supporting pins for an intermediate member, each said finger and having a frangible supporting web connecting it to the main body of the shim or plate.

6. A seat belt retractor as claimed in claim 1, wherein said housing has respective axially spaced internal surfaces located therein formed by a shim or plate one each side of said second member, each said shim or plate being formed to provide support of said intermediate member or members from each end thereof.

7. A seat belt retractor comprising a frame, a belt reel rotatable within the frame, fist means normally operable in a sense to rotate the reel in a belt-rewinding direction, locking means operable to inhibit withdrawal of the belt in the event of an emergency and including a pretensioning actuator with coupling means operable in the event of a crash to rotate the reel in a rewinding direction to tension the belt, wherein said coupling means is provided in a housing and comprises a first member rotationally fixed to the reel, a second normally stationary member which is frangibly supported within the housing and rotatable relative to the housing by said actuator and at least one normally stationary intermediate member normally supported by the housing and separated from the first member but being displaceable by motion of internal cam surfaces of the second member to provide interengagement between the first and second members, and wherein said housing has respective axially spaced internal surfaces located therein formed by a shim or plate one each side of said second member, each said shim or plate being formed to provide support of said intermediate member or members from each end thereof.

8. A seat a belt retractor as claimed in claim 7, wherein said second member is circular and has a peripheral generally cylindrical surface to receive a pulley cable connected to the pretensioning actuator, said shims or plates being circular and at least one of them having a peripheral flange which forms an enclosure for said second member, said intermediate member or members and the part of the cable which is wound on said cylindrical surface.

9. A seat belt retractor as claimed in claim 8, each said shim or plate being formed with deflectable fingers which carry near their ends respective frangible supporting pins for an intermediate member, each said finger having a frangible supporting web connecting it to the main body of the shim or plate.

10. A seat belt retractor as claimed in claim 7, each said shim or plate being formed with deflectable fingers which carry near their ends respective frangible supporting pins for an intermediate member, each said finger having a frangible supporting web connecting it to the main body of the shim or plate.

11. A seat belt retractor comprising a frame, a belt reel rotatable within the frame, first means normally operable in a sense to rotate the reel in a belt-rewinding direction, locking means operable to inhibit withdrawal of the belt in the event of an emergency and including a pretensioning actuator with coupling means operable in the event of a crash to rotate the reel in a rewinding direction to tension the belt, wherein said coupling means is provided in a housing and comprises a first member rotationally fixed to the reel, a second normally stationary member which is frangibly supported by means integrally moulded with an internal surface of the housing and rotatable relative to the housing by said actuator and at least one normally stationary intermediate member normally supported by the housing and separated from the first member but being displaceable by motion of internal cam surfaces of the second member to provide inter-engagement between the first and second members, wherein said internal surface of said housing is a shim or plate which is formed to carry the intermediate member or members each on a respective deflectable finger permitting radial movement thereof towards the said first member.

* * * * *